US009425982B2

(12) United States Patent
Lee et al.

(10) Patent No.: US 9,425,982 B2
(45) Date of Patent: Aug. 23, 2016

(54) SERVER AND METHOD FOR PROVIDING DEVICE MANAGEMENT SERVICE AND DEVICE RECEIVING THE DEVICE MANAGEMENT SERVICE

(75) Inventors: Ji-Hye Lee, Suwon-si (KR); Wuk Kim, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 168 days.

(21) Appl. No.: 13/150,932

(22) Filed: Jun. 1, 2011

(65) Prior Publication Data

US 2011/0295992 A1 Dec. 1, 2011

(30) Foreign Application Priority Data

Jun. 1, 2010 (KR) ........................ 10-2010-0051763

(51) Int. Cl.
*H04L 12/28* (2006.01)
*H04W 4/00* (2009.01)
*H04L 12/24* (2006.01)

(52) U.S. Cl.
CPC ........ *H04L 12/2874* (2013.01); *H04L 12/2889* (2013.01); *H04W 4/001* (2013.01); *H04W 4/005* (2013.01); *H04L 41/0233* (2013.01)

(58) Field of Classification Search
None
See application file for complete search history.

(56) References Cited

U.S. PATENT DOCUMENTS

| 6,363,411 | B1 * | 3/2002 | Dugan | H04M 3/42136 379/201.01 |
| 6,484,177 | B1 * | 11/2002 | Van Huben | G06F 17/30589 |
| 7,369,839 | B2 * | 5/2008 | Haumont | H04W 8/26 455/403 |
| 7,664,514 | B2 * | 2/2010 | Morishima | H04L 12/5815 455/456.3 |
| 8,005,468 | B2 * | 8/2011 | Marolia et al. | 455/418 |
| 8,060,074 | B2 * | 11/2011 | Danford et al. | 455/419 |
| 8,209,676 | B2 * | 6/2012 | Kapadekar et al. | 717/171 |
| 8,340,633 | B1 * | 12/2012 | Rege et al. | 455/406 |
| 8,467,768 | B2 * | 6/2013 | Mahaffey et al. | 455/411 |
| 2005/0021713 | A1 * | 1/2005 | Dugan | H04M 3/42136 709/223 |
| 2005/0039178 | A1 * | 2/2005 | Marolia et al. | 717/168 |
| 2005/0149335 | A1 * | 7/2005 | Mesbah et al. | 704/277 |
| 2005/0182697 | A1 * | 8/2005 | Rao | 705/28 |
| 2005/0239447 | A1 * | 10/2005 | Holzman et al. | 455/414.3 |
| 2006/0089999 | A1 * | 4/2006 | Xiang et al. | 709/229 |
| 2006/0203722 | A1 * | 9/2006 | Oommen | H04L 41/50 370/229 |
| 2007/0015538 | A1 * | 1/2007 | Wang | G06F 9/4448 455/558 |
| 2007/0036294 | A1 * | 2/2007 | Chaudhuri et al. | 379/88.16 |
| 2007/0093243 | A1 * | 4/2007 | Kapadekar | H04M 3/42178 455/419 |
| 2007/0165654 | A1 * | 7/2007 | Chai | H04L 12/24 370/401 |

(Continued)

FOREIGN PATENT DOCUMENTS

KR 1020020030432 4/2002

*Primary Examiner* — Ninos Donabed
(74) *Attorney, Agent, or Firm* — The Farrell Law Firm, P.C.

(57) ABSTRACT

A method for providing a Device Management (DM) service in an M2M environment that enables intelligent data collection and communication through an M2M communication function is provided. In the method, a Network Operator Server (NOS) or an ES provides a DM service menu to a subscriber device. When the subscriber device selects a desired service from the DM service menu, the NOS delegates the DM service authority for a network subscriber to the ES. The ES provides the DM service through an M2M communication with the subscriber device. The ES integrates the DM results and transmits the integrated DM results to the network operator. Accordingly, the NOS can provide an efficient DM service to more devices at a lower cost, by minimal interaction with the ES, through the cooperation enterprise specialized in the DM service.

15 Claims, 4 Drawing Sheets

(56) References Cited

U.S. PATENT DOCUMENTS

| | | | |
|---|---|---|---|
| 2007/0294385 A1* | 12/2007 | Kapadekar et al. | 709/223 |
| 2008/0040490 A1* | 2/2008 | Karlberg | 709/228 |
| 2008/0045192 A1* | 2/2008 | Zhao | H04L 63/104 455/414.2 |
| 2008/0052279 A1* | 2/2008 | Marolia et al. | 707/3 |
| 2008/0057947 A1* | 3/2008 | Marolia et al. | 455/425 |
| 2008/0072043 A1* | 3/2008 | Lee | H04W 12/06 713/168 |
| 2008/0159257 A1* | 7/2008 | Alfano et al. | 370/349 |
| 2008/0168165 A1* | 7/2008 | Araki | 709/223 |
| 2009/0036111 A1* | 2/2009 | Danford et al. | 455/419 |
| 2009/0205028 A1* | 8/2009 | Smeets et al. | 726/6 |
| 2010/0037248 A1* | 2/2010 | Lo | H04B 1/48 725/1 |
| 2010/0185727 A1* | 7/2010 | Mittal | 709/203 |
| 2010/0198886 A1* | 8/2010 | Ferrazzini | H04L 41/0213 707/822 |
| 2010/0210240 A1* | 8/2010 | Mahaffey et al. | 455/411 |
| 2012/0210315 A1* | 8/2012 | Kapadekar et al. | 717/172 |

* cited by examiner

SERVER AND METHOD FOR PROVIDING DEVICE MANAGEMENT SERVICE AND DEVICE RECEIVING THE DEVICE MANAGEMENT SERVICE

PRIORITY

This application claims priority under 35 U.S.C. §119(a) to a Korean Patent Application filed in the Korean Intellectual Property Office on Jun. 1, 2010 and assigned Serial No. 10-2010-0051763, the entire disclosure of which is incorporated herein by reference.

BACKGROUND OF THE INVENTION

1. Field of the Invention

The present invention relates generally to an apparatus and method for Device Management (DM), and more particularly, to an apparatus and method for providing a Machine-to-Machine (M2M) DM service by leasing a network from a network operator.

2. Description of the Related Art

A DM protocol is defined by a total of 5 messages, which include 5 packages, numbered #0 to #4, and a DM session may be established between a DM server and a device through the DM protocol. The DM session may be initiated by a DM server or client, i.e., a device.

FIG. 1 is a flow diagram illustrating a typical DM session setup process.

Referring to FIG. 1, if there is a management operation to be performed in a device, a DM server 20 transmits a package #0 notification message to the 30 device (e.g., a DM client 10 in the device) to notify of a DM action in step 101. In step 103, after receiving the package #0 notification message, the DM client 10 transmits a package #1 message to the DM server 20 to request a DM session setup. In step 105, the DM server 20 accepts the DM session setup and transmits a package #2 message, which includes a DM command for an intended DM operation, to the DM client 10. In step 107, in response to the package #2 message, the DM client 10 transmits a package #3 message to the DM server 20 to transmit the execution results of the DM command received from the DM server 20.

In step 109, the DM server 20 transmits a package #4 message to the DM client 10 to terminate the DM session or to transmit an additional management operation to the DM client 10. The DM client 10 performs the additional management operation included in the package #4 message, and reports the results to the DM server 20 through the package #3 message. Thereafter, the DM server 20 and the DM client 10 may provide a management operation or management commands by repeating the package #4 message and the package #3 message. Thus, if a management operation is continuously included in the package #4 message, the DM session is maintained. However, if there is no additional management operation, the DM session terminates.

As described above, a conventional DM service is provided only through a DM server of a wireless network operator. However, because the DM services provided by wireless network operators are saturated with an increase in types of DM services and number of subscribers, it is necessary to subdivide the DM services.

Also, a system, which enables a device manufacturer, a software developer or a content provider (i.e., not a network operator) to directly manage firmware or software functions of devices, can provide a more efficient DM service.

Therefore, an apparatus and method are required for enabling a cooperation enterprise to provide a DM service using network subscriber information and a network of the network operator.

SUMMARY OF THE INVENTION

An embodiment of the present invention is to provide an apparatus and method for providing a DM service to a plurality of devices through service cooperation between a network operator and a DM service cooperation enterprise.

Another embodiment of the present invention is to provide an apparatus and method for providing a DM service menu.

Yet another embodiment of the present invention is to provide an apparatus and method for classifying devices based on information about subscriber devices having subscribed to a DM service and providing the subscriber device information to a DM service cooperation enterprise to delegate the DM service to the DM service cooperation enterprise.

Still another embodiment of the present invention is to provide an apparatus and method for informing the processing results of a DM service delegated to a DM service cooperation enterprise.

According to an aspect of the present invention, a method for providing a DM service in a DM server includes receiving a delegation of a DM service authority for one or more subscriber devices having subscribed to an operator network, from a Network Operator Server (NOS) managing the subscriber devices; determining a service to be provided to the subscriber devices; and providing the determined service to the subscriber devices.

According to another aspect of the present invention, a DM server for providing a DM service includes a connection unit configured to receive a message for delegating the DM service authority for one or more subscriber devices having subscribed to an operator network, from a NOS managing the subscriber devices, and transmit a connection request to the subscriber devices to be provided with a DM service; and a message managing unit configured to determine a service to be provided to the connected subscriber devices, and provide the determined service to the subscriber devices.

According to another aspect of the present invention, a device for receiving a DM service includes a user interface configured to receive a DM service menu from a DM server, display the received DM service menu, and select at least one service from the DM service menu; and a control unit configured to generate and transmit a response message including information about the device and the selected service, receive a message for the selected service from the DM server, execute the selected service, and transmit a result report message, wherein the DM server is a server of a cooperation enterprise that cooperates for a DM service with a server of an operator network to which the device has subscribed.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS OF THE PRESENT INVENTION

Embodiments of the present invention will be described below in detail with reference to the accompanying drawings. The present invention may, however, be embodied in different forms and should not be construed as limited to the embodiments set forth herein; rather, these embodiments are provided so that this disclosure will be thorough and complete, and will fully convey the scope of the present invention to those skilled in the art. In the following description, detailed descriptions of well-known functions or configurations will be omitted since they would unnecessarily obscure the subject matters of the present invention.

For the sake of convenience, terms regarding names of entities defined in DM of Open Mobile Alliance (OMA), which is an organization for standardization of applications of mobile terminals, are used to describe the present invention. However, it should be noted that the scope of the present invention is not limited by such terms, and the present invention may also be applicable to systems with similar technical backgrounds.

The present invention provides a method for providing a DM service in a M2M environment, which enables intelligent data collection and communication through an M2M communication function.

To this end, the present invention includes cooperating for a DM service between a network operator and a DM service cooperation enterprise, providing a DM service menu from the network operator to a subscriber device, storing information about subscriber devices having subscribed to the DM service and classifying the devices according to service objects, and delegating the management of the subscriber devices to the DM service cooperation enterprise.

Further, the present invention includes the DM service cooperation enterprise connecting (i.e., bootstrapping) to provide a DM service, providing a DM service to each device, and integrating the DM results and transmitting the integrated DM results at the request of the network operator.

Figure 2:
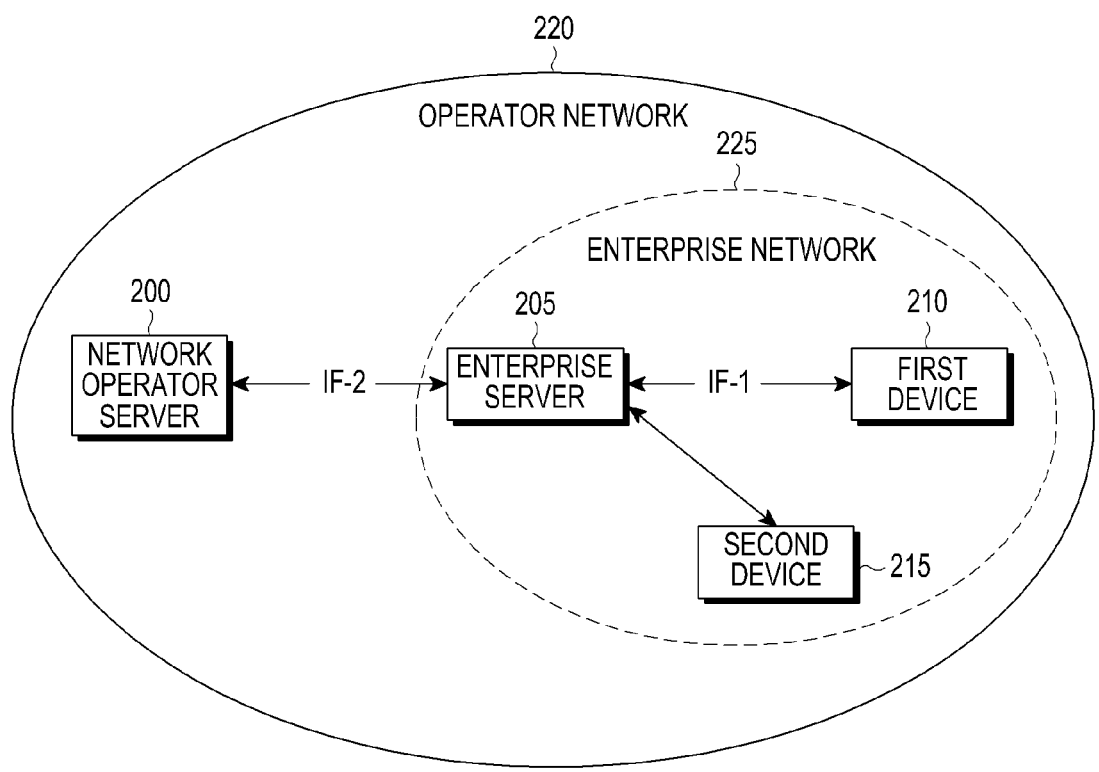
FIG. 2 is a block diagram of a DM system for providing an M2M DM service according to an embodiment of the present invention.

A configuration of a DM system with the above function will be described with reference to FIG. 2. FIG. 2 is a block diagram of a DM system for providing an M2M DM service according to an embodiment of the present invention.

Referring to FIG. 2, the DM system includes a NOS 200, an ES 205, a first device 210, and a second device 215.

The NOS 200 is located in an operator network 220. The NOS 200 manages and stores information about network subscriber devices and manages the service subscription of each subscriber device. The NOS 200 is configured to delegate or transfer DM service authority for network subscribers to a cooperation enterprise so that the cooperation enterprise can lease a network of a wireless network operator or can provide a DM service through the leased network.

Generally, the NOS 200 uses a DM server of the network operator to manage applications and services in devices. However, in one embodiment, the function of a DM server is delegated to the ES 205. Thus, the NOS 200 can provide an efficient DM service to more devices at a lower cost, by minimal interaction with the ES 205, through a cooperation enterprise specialized in the DM service.

The ES 205 is a server of an enterprise cooperating with the network operator. The ES 205 is located on a network leased from the network operator. In FIG. 2, the network leased from the network operator is represented as an enterprise network 225. The ES 205 provides a DM service for managing firmware, software, parameter, schedule and hardware (H/W) functions of devices. The ES 205 may be a server of a content provider (e.g., a software developer such as a security program developer), a device manufacturer or a DM service provider that cooperates with the network operator.

In this manner, it is not the network operator but a device manufacturer, a software developer or a content provider can provide a specialized DM service through the ES 205 capable of directly managing software or firmware functions of devices, thus making it possible to provide a more efficient DM service.

The first device 210 and the second device 215 are devices which have subscribed to the operator network 220. For example, the first device 210 and the second device 215 may be various subscriber devices such as mobile phones, notebook computers, MP3 players, and TVs that need DM such as firmware update, software update, and environment configuration. In an embodiment, the first device 210 and the second device 215 may be devices having subscribed to a DM service in the operator network 220. In another embodiment, the first device 210 and the second device 215 may have subscribed to a DM service by receiving a DM service menu and selecting a desired service. The first device 210 and the second device 215 include a DM client that processes DM messages and commands and manages access to a DM tree.

Figure 3:
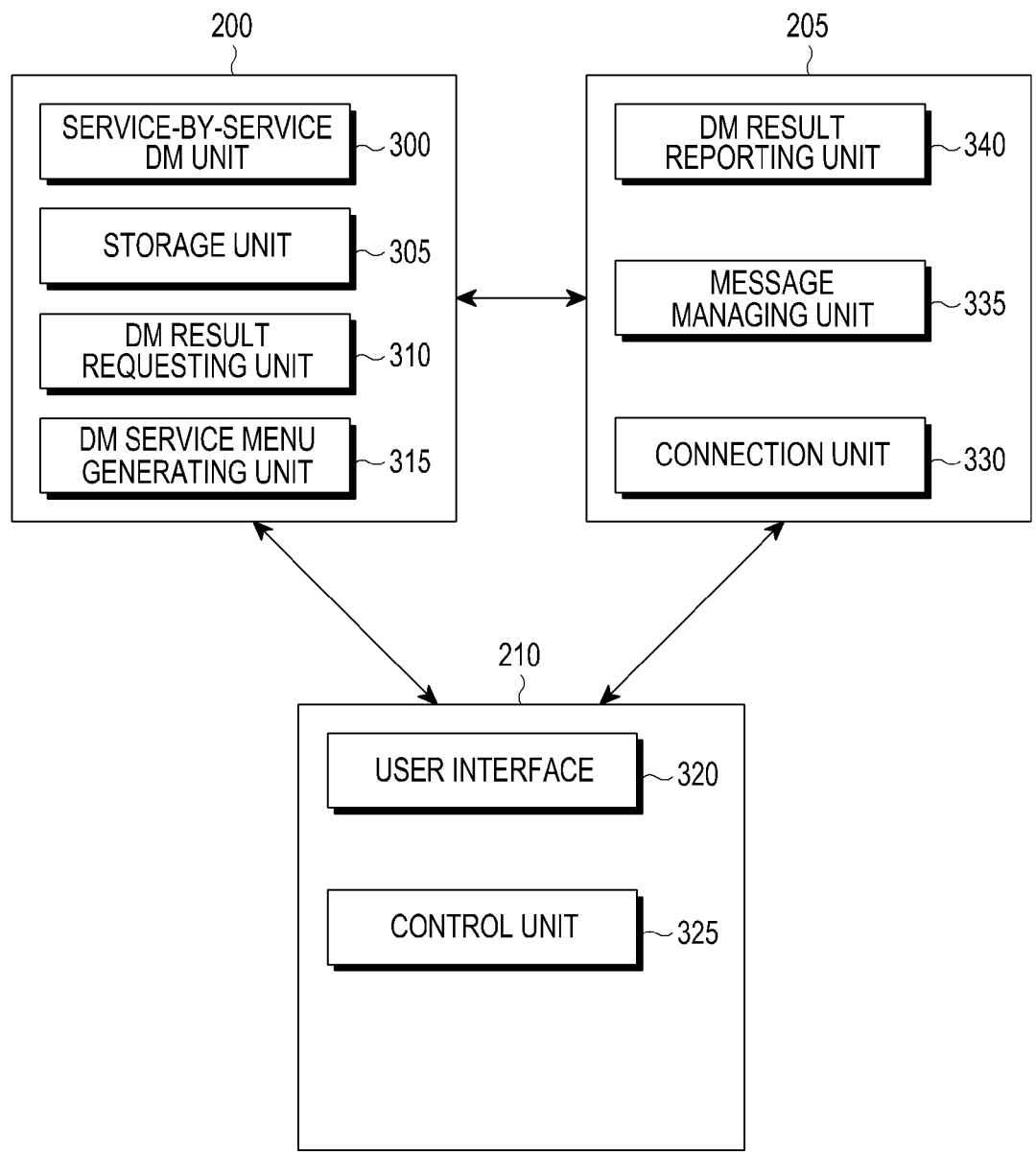
FIG. 3 illustrates detailed block diagrams of a NOS, an Enterprise Server (ES) and a device of FIG. 2.

Detailed operations of the NOS 200, the ES 205 and the first device 210 in the DM system will be described with reference to FIG. 3. FIG. 3 illustrates detailed block diagrams of the NOS 200, the ES 205 and the first device 210 in the DM system of FIG. 2. The elements and operations of the second device 215 are substantially the same as those of the first device 210 and thus their description is omitted for conciseness.

Referring to FIG. 3, the NOS 200 includes a service-by-service DM unit 300, a storage unit 305, a DM result requesting unit 310, and a DM service menu generating unit 315.

The NOS 200 cooperates with the ES 205 for a DM service to delegate the DM service. This cooperation process is performed bases on the negotiation between the network operator and the cooperation enterprise, and the present invention provides a DM method on the assumption that the network operator and the cooperation enterprise have cooperated for a DM service. Thus, a detailed description of the cooperation process is omitted for conciseness.

In cooperation with the ES 205, the NOS 200 delegates a DM service to the ES 205 through the following process. First, the DM service menu generating unit 315 generates a DM service menu and provides the DM service menu to the first device 210 and the second device 315 that have subscribed to a DM service. The DM service menu is a menu which can be serviced by the cooperation enterprise through the ES 205. For example, the DM service menu may include Firmware Update Management Object (FUMO), Software Component Management Object (SCOMO), diagnosis and monitoring, and environment configuration.

In an embodiment, the DM service menu generating unit 315 is included in the NOS 200 as illustrated in FIG. 3. In another embodiment, the DM service menu generating unit 315 may be included in the ES 205. The ES 205 may directly provide a DM service menu to the first device 210 and the second device 215. The ES 205 may receive a response message including information about a service selected by each device. Thus, by classifying devices by services, the ES 205 may have DM information for each service before receiving a delegation message. Therefore, when receiving the delegation message, the ES 205 may use the service-by-service DM information to determine a target device destined to receive a connection request.

The service-by-service DM unit 300 performs a service-by-service DM operation based on a response message received from the first device 210 and the second device 215 that have received a DM service menu. For example, the response message includes device information and information about a service selected through the DM service menu by the first device 210 and the second device 215. Accordingly, the service-by-service DM unit 300 stores the device information in the storage unit 305, classifies the devices by the selected services, and provides the service-by-service DM information to the ES 205. A DM delegation message is used to provide the service-by-service DM information to the ES 205, and the DM delegation message is transmitted to complete a DM service delegation process. When the DM service delegation process is completed, the ES 205 operates as a DM server.

The DM result requesting unit 310 requests and receives the results of the DM service from the ES 205. The NOS 200 can then receive the results of the DM service at any time although the NOS 200 has delegated the DM service to the ES 205. Thus, the network operator can provide various DM services, thus making it possible to improve the network utilization efficiency and provide an efficient DM service to more subscribers.

The ES 205 includes a connection unit 330, a message managing unit 335, and a DM result reporting unit 340.

When receiving a delegation message from the service-by-service DM unit 300, the connection unit 330 determines a DM service target based on the device information included in the delegation message. A connection request message is then transmitted to the first device 210 and the second device 215 that are DM service targets. A bootstrap message may be used as the connection request message. For example, the connection request message includes authentication information and information about the ES 205 that is a DM server of the cooperation enterprise.

When the connections with the first device 210 and the second device 215 are completed, the message managing unit 335 generates a package message for providing a service selected by the first device 210 and the second device 215. Thereafter, the message managing unit 335 transmits the package message to the first device 210 and the second device 215.

The DM result reporting unit 340 receives the package message processing results from the first device 210 and the second device 215. In an embodiment, the DM result reporting unit 340 notifies each of the package message processing results to the NOS 200 whenever receiving each of the package message processing results from the first device 210 and the second device 215. In another embodiment, the DM result reporting unit 340 receives all of the package message processing results from the first device 210 and the second device 21, integrates all of the received package message processing results, and notifies the integrated package message processing results to the NOS 200 at the request of the NOS 200.

The first device 210 includes a user interface 320 and a control unit 325. The user interface 320 includes a display unit and an input unit. The user interface 320 enables the user to select a desired service when the first device 210 receives a DM service menu. To this end, the display unit is configured to display the DM service menu, and the input unit is configured to select at least one service from the DM service menu.

The control unit 325 generates a response message including device information and information about the service selected by the user through the user interface 320, and transmits the response message to the NOS 200. If the device has subscribed to the operator network 220 but has not subscribed to the DM service, the response message may also serve as a subscription request message for the service selected from the DM service menu.

Also, when receiving a connection request message from the ES 205, the control unit 325 stores authentication information and information about the ES 205 that are included in the connection request message. Thereafter, when receiving a package message for the selected service from the ES 205, the control unit 325 uses the stored information to authenticate the package message, executes a service included in the package message, and returns an execution result message to the ES 205.

Figure 4:
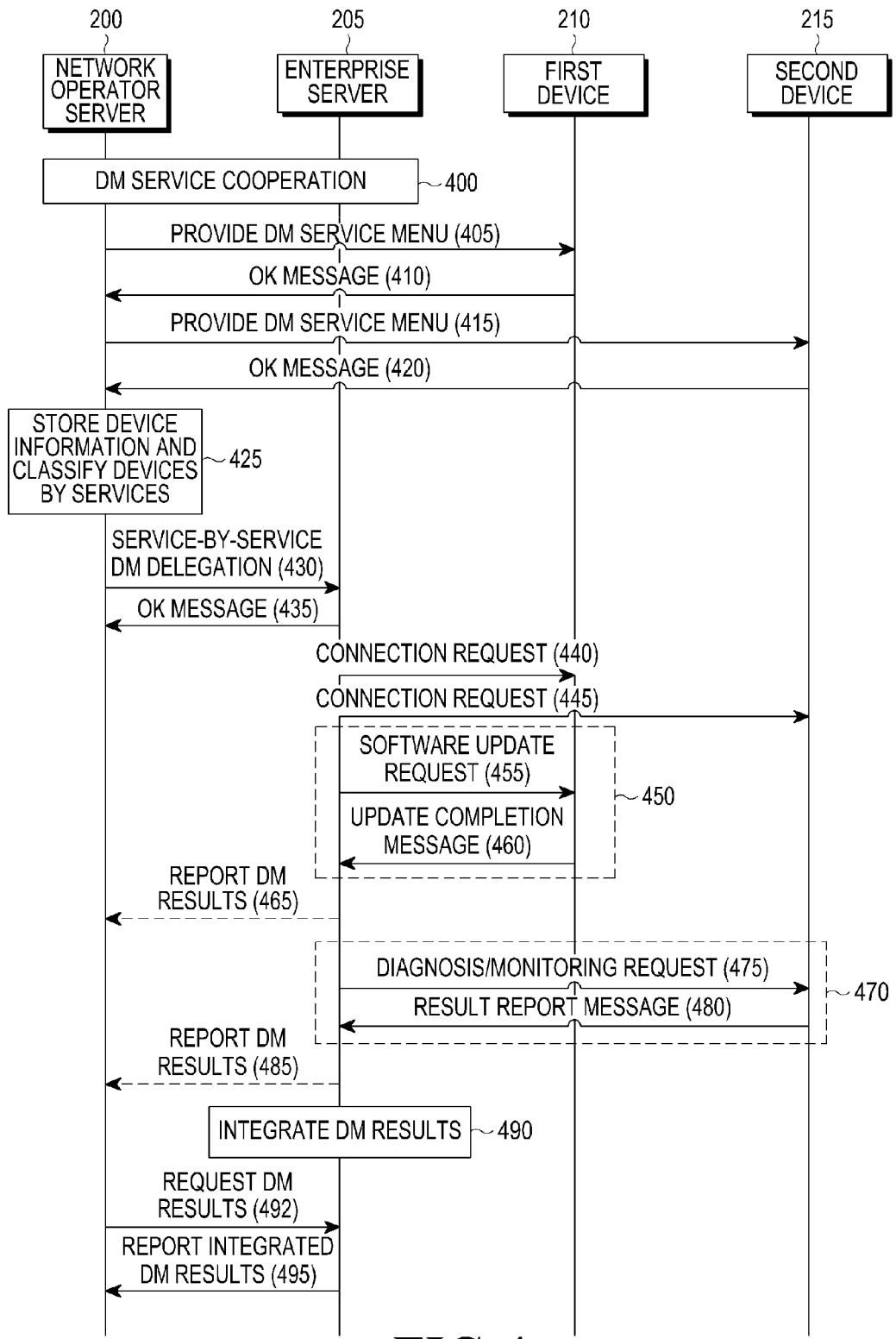
FIG. 4 is a flow diagram illustrating a DM process performed through a network operator and a DM service cooperation enterprise according to an embodiment of the present invention.

FIG. 4 is a flow diagram illustrating a process for providing a DM service through the NOS 200 and the ES 205 according to an embodiment of the present invention.

Referring to FIG. 4, a network operator and a cooperation enterprise must cooperate for a DM service. Accordingly, in step 400, the NOS 200 and the ES 205 perform an operation for DM service cooperation. Accordingly, the network operator delegates subscriber DM to the cooperation enterprise, and the cooperation enterprise can use subscriber information and a network of the network operator. The network operator may cooperate with a plurality of cooperation enterprises for DM services.

In steps 405 and 415, the NOS 200 provides a DM service menu of the cooperation enterprise to devices of DM service subscribers, for example, the first device 210 and the second device 215. The DM service menu may include firmware update (FUMO), software update (SCOMO), diagnosis/monitoring, and environment configuration.

When receiving the DM service menu, the first device 210 and the second device 215 select desired services and transmit response (OK) messages including relevant device information in steps 410 and 420. In an embodiment of the present invention, it is assumed that the first device 210 selects a software update service, and the second device 215 selects a diagnosis and monitoring service.

When receiving the response messages from the first device 210 and the second device 215, the NOS 200 extracts device information from the response messages, stores the device information, and classifies the devices by the desired DM services, in step 425. In step 430, the NOS 200 transmits a service-by-service DM delegation message to the ES 205. The service-by-service DM delegation message includes service-by-service DM information such as device information classified by the service selected by each device. From the service-by-service DM information, the ES 205 recognizes target devices that will receive different services.

When receiving the service-by-service DM delegation message in step 430, the ES 205 transmits a response message to the NOS 200 in step 435. Thereafter, the ES 205 detects target devices that will receive services. In steps 440 and 445, the ES 205 transmits a connection request message to the first device 210 and the second device 215 that are the target devices. The connection request message may include DM server information of the cooperation enterprise, that is, authentication information and information about the ES 205.

In step 455, the ES 205 transmits a package message for a to the first device 210. The package message corresponds to the conventional package #2 message. The ES 205 may transmit the software update request package message including an address for software update contents instead of the software update contents, and the first device 210 may download the software update contents from the address. The first device 210 compares the authentication information and the DM server information included in the connection request message of step 445 with the information included in the package message received in step 455, and performs a software update if they are identical to each other. In step 460, the first device 210 transmits a package message for update completion notification to the NOS 200. The update completion notification package message corresponds to the conventional package #3 message. In step 465, the ES 205 reports the DM results to the NOS 200.

Figure 1:
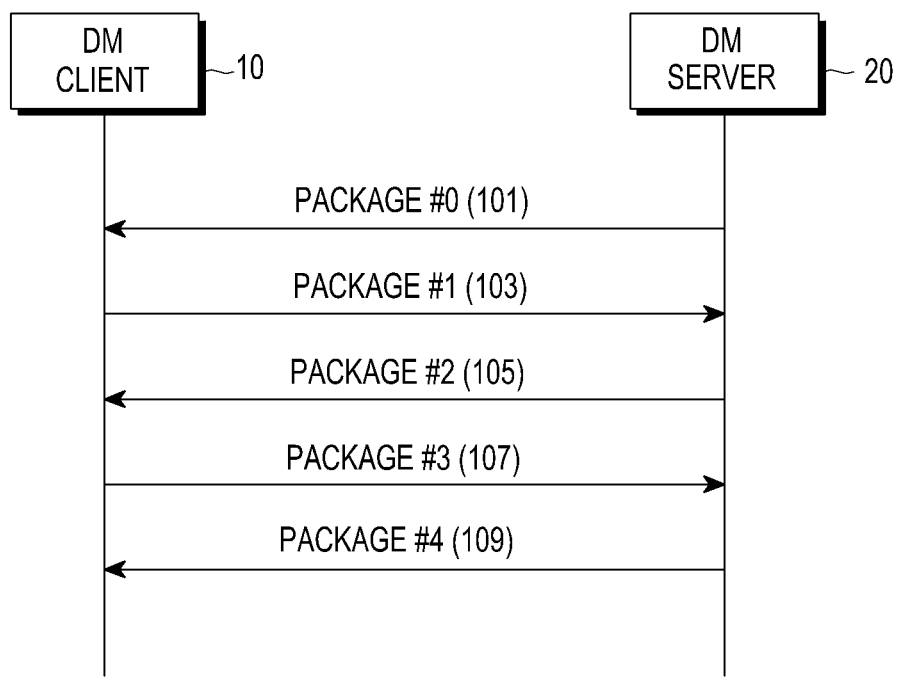
FIG. 1 is a flow diagram illustrating a conventional DM process.

Through communication of the package messages, a DM session is established in step 450. Because the ES 205 has already received the device information via the DM delegation message, it is possible to omit the DM package communication operations that had to be performed for the device information exchange and authentication process. In other words, it is possible to omit the operations corresponding to the steps from the package #0 to the package #1 illustrated in FIG. 1. According to the embodiments of the present invention, the conventional operations of transmitting a series of messages exchanged with the DM server to provide device information whenever initiating a DM session can be omitted, thus, optimizing the DM session.

The second device 215 has selected a diagnosis and monitoring service. Therefore, in step 475, the ES 205 transmits a diagnosis/monitoring request package message to the second device 215. The second device 215 compares the information included in the diagnosis/monitoring request package message with the authentication information and the DM server information obtained in advance, and determines whether they are identical to each other. If they are identical to each other, the second device 215 collects the diagnosis/monitoring results regarding the relevant parameters and transmits a result report message including the collected results to the ES 205 in step 480. When receiving the result report message, the ES 205 directly transmits the message to the NOS 200 in step 485.

In the above embodiment, the ES 205 directly transmits a result report message about the package message to the NOS 200 whenever receiving the result report message. In another embodiment, the ES 205 collects DM results until receiving result report messages from all devices, and integrates the collected DM results in step 490. When the NOS 200 requests the DM results in step 492, the ES 205 transmits an integrated DM result message including the collected processing results to the NOS 200 in step 495.

As described above, according to the present invention, the network operator can delegate a DM service to the cooperation enterprise to provide the DM service to a subscriber. Moreover, the network operator can receive the integrated DM processing results when necessary. Accordingly, the present invention can improve the network utilization efficiency, and can provide an efficient DM service to more subscribers.

Further, according to the present invention, users can selectively subscribe different DM services to their respective devices. Also, by providing the device information in advance when subscribing the DM service, the present invention can omit the conventional operations of transmitting a series of messages exchanged with the DM server to provide device information whenever initiating a DM session, thus making it possible to optimize the DM session.

While the invention has been shown and described with reference to embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for an enterprise server to provide a Device Management (DM) service, the method comprising:
   receiving, by an enterprise server, a delegation message delegating a DM service authority of a DM server for one or more subscriber devices having subscribed to an operator network, from a Network Operator Server (NOS) managing the one or more subscriber devices in the operator network, wherein the one or more subscriber devices are in a network of the enterprise server;
   providing, by the NOS or the enterprise server, a DM service menu to the one or more subscriber devices, the DM service menu having DM information for each service available to the one or more subscriber devices;
   receiving a response message including selection information on one or more services selected by each of the one or more subscriber devices through the DM service menu;
   determining a service to be provided to the one or more subscriber devices based on the selection information;
   providing, by the enterprise server, the determined service to the one or more subscriber devices;
   receiving, by the enterprise server, one or more DM report messages from the one or more subscriber devices in response to the provided service; and
   reporting, to the NOS by the enterprise server, a DM result about the service provided to the one or more subscriber devices, based on the received one or more DM report messages.

2. The method of claim 1, further comprising:
   cooperating, by the enterprise server, with the NOS for a DM service before receiving the delegation of the DM service authority.

3. The method of claim 1, wherein the delegation message delegating the DM service authority includes DM information for each service from the NOS.

4. The method of claim 1, wherein the service is determined further based on device information on the one or more subscriber devices which selected the one or more services.

5. The method of claim 4, wherein the device information is included in the delegation message or the response message.

6. The method of claim 1, wherein the DM service menu includes at least one of a firmware update service, a software update service, a diagnosis and monitoring service, and an environment configuration service.

7. The method of claim 1, wherein the service to be provided to the one or more subscriber devices is determined based on the DM information for each service.

8. The method of claim 1, wherein providing, by the enterprise server, the determined service to the one or more subscriber devices comprises:
   transmitting a connection request message to the one or more subscriber devices to provide a DM service.

9. The method of claim 1, wherein reporting the DM result comprises:

if a plurality of DM result report messages are received from a plurality of subscriber devices, collecting, by the enterprise server, the received plurality of DM report messages, integrating the collected plurality of DM report messages, and transmitting the integrated DM report message to the NOS in response to a DM result request of the NOS.

10. An enterprise server for providing a Device Management (DM) service, comprising:

a receiver configured to receive a delegation message delegating DM service authority of a DM server for one or more subscriber devices subscribed to an operator network, from a Network Operator Server (NOS) managing the one or more subscriber devices in the operator network;

a transmitter configured to transmit a connection request to the one or more subscriber devices to be provided with a DM service, wherein the one or more subscriber devices are in a network of the enterprise server; and a processor configured to:
provide a DM service menu to the one or more subscriber devices, the DM service menu having DM information for each service available to the one or more subscriber devices,
control the receiver to receive a response message including selection information on one or more services selected by each of the one or more subscriber devices through the DM service menu,
determine a DM service to be provided to the connected subscriber devices based on the selection information,
provide the determined DM service to the one or more subscriber devices,
receive one or more DM report messages from the one or more subscriber devices in response to the provided service, and
report to the NOS a DM result about the DM service provided to the one or more subscriber devices, based on the received one or more DM report messages.

11. The enterprise server of claim 10, wherein the enterprise server is a server of a cooperation enterprise cooperating with the NOS for a DM service.

12. The enterprise server of claim 10, wherein the service is determined further based on device information on the one or more subscriber devices which selected the one or more services.

13. The enterprise server of claim 12, wherein the device information is included in the delegation message or the response message.

14. The enterprise server of claim 12, wherein the DM service menu includes at least one of a firmware update service, a software update service, a diagnosis and monitoring service, and an environment configuration service.

15. The enterprise server of claim 10, wherein if a plurality of DM report messages are received from a plurality of subscriber devices, the processor collects the received plurality of DM report messages, integrates the collected plurality of DM report messages, and transmits the integrated DM report message to the NOS in response to a DM result request of the NOS.

* * * * *